Patented Jan. 1, 1935

1,986,495

UNITED STATES PATENT OFFICE 1,986,495

MOLECULAR ADDITION COMPOUNDS OF MANGANESE NITRATE, UREA, AND WATER

Ernest R. Boller, Cleveland Heights, Ohio, assignor to The Grasselli Chemical Company, Cleveland, Ohio, a corporation of Delaware No Drawing. Application July 8, 1933, Serial No. 679,583

3 Claims. (Cl. 260—11)

The present invention relates to a new composition of matter consisting of molecular addition compounds of manganese nitrate hydrates and urea.

Manganese nitrate crystallizes with 6 or with 3 mols of water of crystallization, the melting points of these two hydrates being 25.8° C. for the hexahydrate and 35.5° C. for the trihydrate. Thus in warm summer weather these compounds melt in their own water of crystallization which makes it exceedingly difficult and costly to handle and ship these materials.

In addition, the hydrates of manganese nitrate are very hygroscopic. This further increases the difficulty of handling these materials. In preparing compositions containing manganese nitrate, it is usually necessary to mix in the manganese nitrate as soon as it is crystallized and then seal the product in air-tight containers immediately.

Furthermore, it is rather difficult to crystallize manganese nitrate. It is the present practice to prepare a manganese nitrate solution of highest practical concentration and then solidify this by rather strenuous refrigeration. This is a troublesome and expensive operation.

I have found that the manganese nitrate hydrates form definite addition compounds or double compounds with urea which have a substantially higher melting point than the individual manganese nitrate hydrates or their mixtures, and which are far less hygroscopic than the manganese nitrate hydrates.

These addition compounds are produced by adding urea to melts of the manganese nitrate hydrates and cooling the mixtures to effect solidification.

The amounts of urea which can be added in this manner to manganese nitrate hydrates to form solid products of higher melting points than the nitrates do not necessarily follow stoechiometric proportions. Within reasonable limits the stability and non-hygroscopicity of the solid addition compound is directly proportional to the amount of urea and inversely proportional to the amount of water in the product.

Compositions of very useful properties have been prepared within the range of compositions corresponding to the formula $$Mn(NO_3)_2.XCO(NH_2)_2.YH_2O$$

in which X is from 1 to 3 and Y from 3 to 6 and preferred compositions will be found within the range of compositions of X from 1.5 to 2 and Y from 3 to 5.

Materials within these ranges do not soften appreciably at temperatures up to 40° C.; they are under ordinary circumstances practically non-hygroscopic and easily water soluble. They can be mixed with other materials such as manganese-phosphates, alkali metal nitrates, etc. without losing their own properties.

In preparing my novel compounds I prepare a melt of manganese nitrate hydrate of the desired water content between 3 and 6 mols $H_2O$ per mol of $Mn(NO_3)_2$. I heat this to about 50 to 75° C. and stir into the melt the desired amount of urea. Higher temperatures are preferably avoided to prevent undue hydrolysis or other reactions. This solution is then cooled to about room temperature, the crystal magma being stirred as long as possible. The magma eventually sets to a hard, solid mass, the time required depending upon the rate of heat transfer. The solid mass is then broken up and is ready for packaging and use.

In the following I am giving specific examples of the preparation of manganese nitrate hydrate-urea compounds within the scope of my invention.

*Example 1.*—2270 gms. manganese nitrate crystals containing 4.7 mols water per mol manganese nitrate were heated to 75° C. and 780 gms. urea, 1.5 mols urea per mol manganese nitrate, were dissolved therein. The solution was solidified, with constant stirring, in a cold water bath. The solid product obtained did not soften appreciably when held at 40° C. for two hours, and was only slightly hygroscopic.

*Example 2.*—1930 gms. manganese nitrate solution containing 5 mols water per mol manganese nitrate were heated to 75° C. and 860 gms. urea, 2 mols per mol manganese nitrate, were dissolved therein. The solution was solidified, with constant stirring, by cooling in a water bath. The product obtained did not soften when held at 40° C. for two hours. On exposure to air for several days this product was not only non-deliquescent but slightly efflorescent.

In view of the high melting point of my novel compounds and the innocuous character of the urea contained therein, I found that they can in most cases be substituted for the manganese nitrate hydrates used in the chemical industry, thus avoiding the uneconomical handling difficulties encountered with the straight manganese nitrate hydrates.

I claim:

1. As a new composition of matter a crystalline manganese nitrate hydrate-urea compound having a melting point not below 40° C.

2. As a new composition of matter a crystalline manganese nitrate, water and urea compound in which the 3 ingredients are present in the molecular proportion of $1Mn(NO_3)_2$, from 3 to 6 $H_2O$ and from 1 to 3 $CO(NH_2)_2$.

3. As a new composition of matter a crystalline manganese nitrate, water and urea compound in which the 3 ingredients are present in the molecular proportion of $1Mn(NO_3)_2$, from 3 to 5 $H_2O$ and from 1.5 to 2 $CO(NH_2)_2$.

ERNEST R. BOLLER.